United States Patent [19]

Task et al.

[11] Patent Number: 4,625,972
[45] Date of Patent: Dec. 2, 1986

[54] SEMI- TWO-DIMENSIONAL DECOYS

[75] Inventors: Harry L. Task; Michael B. Tutin, both of Dayton; Gregory R. Bothe, West Carrollton, all of Ohio

[73] Assignee: The United States of America as represented by the Secretary of the Air Force, Washington, D.C.

[21] Appl. No.: 724,713

[22] Filed: Apr. 18, 1985

[51] Int. Cl.⁴ .......................... F41J 1/00; B64C 39/02
[52] U.S. Cl. ................................. 273/348; 434/372; 446/94
[58] Field of Search .................. 273/348, 407, 87.4; 434/11, 14, 15, 72, 372; 446/94

[56] References Cited

U.S. PATENT DOCUMENTS

| | | | |
|---|---|---|---|
| 1,653,291 | 12/1927 | Katow | 446/94 |
| 2,315,463 | 3/1943 | Tingley et al. | 434/72 |
| 2,635,359 | 4/1953 | Broscious | 434/72 |
| 3,939,600 | 2/1976 | Eid | 446/94 |
| 4,458,441 | 7/1984 | Bril | 446/94 |

FOREIGN PATENT DOCUMENTS 246707 10/1947 Switzerland ......................... 446/94

Primary Examiner—Paul E. Shapiro
Attorney, Agent, or Firm—Bobby D. Scearce; Donald J. Singer

[57] ABSTRACT

A novel decoy providing the deceptive appearance of a genuine three-dimensional object, such as a vehicle, is described which comprises a plurality of modular table units each of predetermined shape and assembled in an abutting relationship to form an outline of the vehicle, each said table unit supported by a framework including leg elements in a spaced relationship above the ground whereby a shadow is cast in said outline, to further the deceptive appearance of said decoy as viewed from the air, and a vertical element, supported by said assemblage of table units, in the shape of an elevational view of said vehicle, to provide a deceptive elevational view of said vehicle.

2 Claims, 2 Drawing Figures

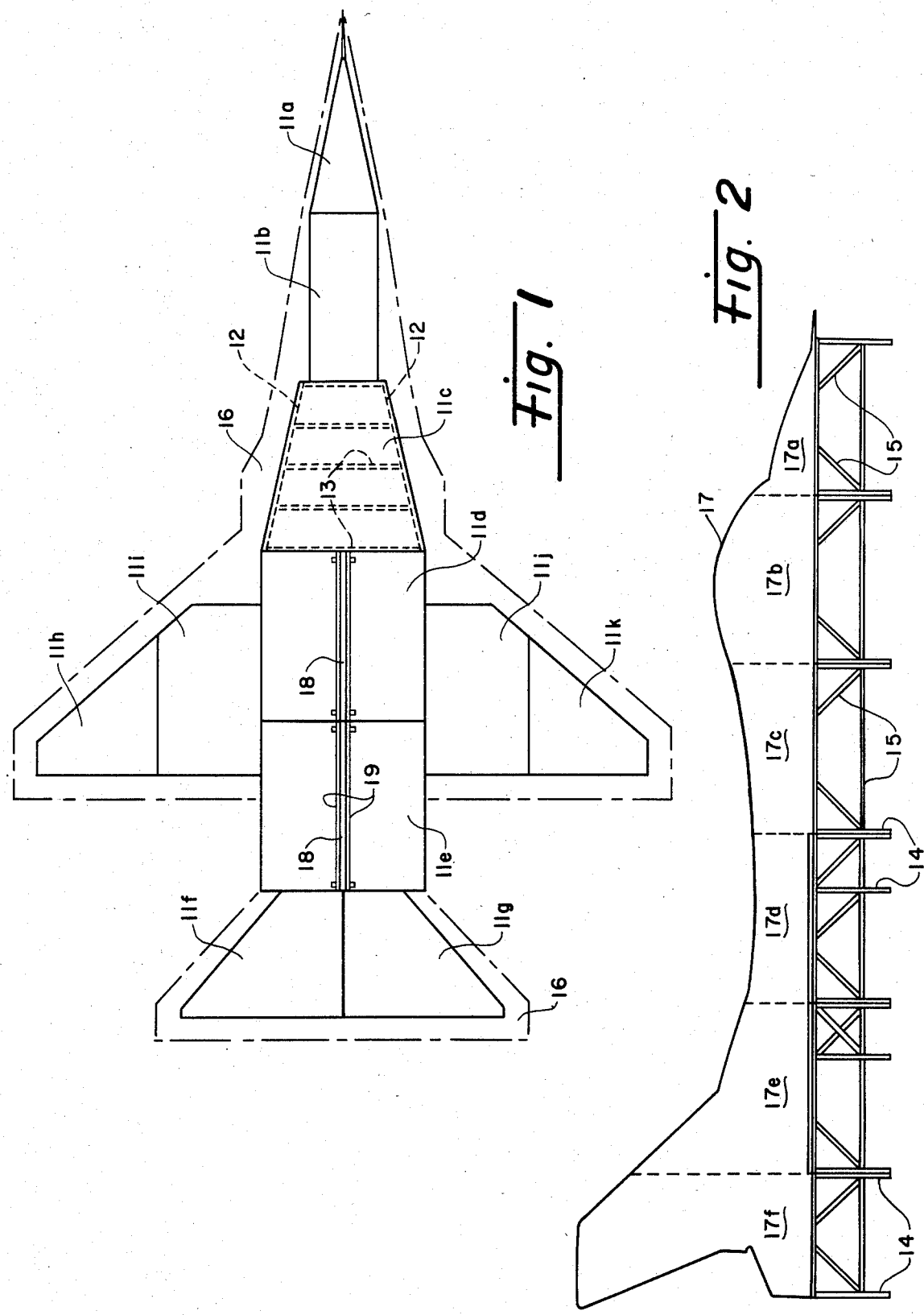

SEMI-TWO-DIMENSIONAL DECOYS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to models and techniques of simulation of vehicles for decoy, deception or camouflage purposes, and more particularly to a novel modular decoy device for simulation of valuable equipment, such as aircraft.

The present invention provides a novel decoy and construction and assembly technique for a semi-two-dimensional decoy using readily available, inexpensive materials. The decoy of the present invention comprises a horizontal section of a plurality of modular table units, each of predetermined shape and assembled in an abutting relationship to form the outline of the vehicle intended to be simulated, and supporting a vertical section, the horizontal and vertical sections corresponding to the plan and elevational views, respectively, of the actual object being simulated. A dual profile of the object is thus provided and creates the illusion of a real three-dimensional object. The present invention provides an inexpensive decoy for expensive assets, such as aircraft, against observation, detection and destruction, and may provide diversions for expenditure of ordnances by an attacking hostile force.

It is therefore, a principal object of the present invention to provide an improved decoy for creating a deception against surveillance and destruction of valuable assets, such as aircraft.

It is a further object to provide an inexpensive decoy which may be easily assembled or disassembled.

These and other objects of the present invention will become apparent as the detailed description of certain representative embodiments thereof proceeds.

SUMMARY OF THE INVENTION

In accordance with the foregoing principles and objects of the present invention, a novel decoy providing the deceptive appearance of a genuine three-dimensional object, such as a vehicle, is described which comprises a plurality of modular table units each of predetermined shape and assembled in an abutting relationship to form an outline of the vehicle, each said table unit supported by a framework including leg elements in a spaced relationship above the ground whereby a shadow is cast in said outline, to further the deceptive appearance of the decoy as viewed from the air, and a vertical element, supported by said assemblage of table units, in the shape of an elevational view of said vehicle, to provide a deceptive elevational view of said vehicle.

DESCRIPTION OF THE DRAWINGS

The present invention will be more clearly understood from a reading of the following detailed description in conjunction with the accompanying drawings wherein:

FIG. 1 is a plan view of a plurality of modular units comprising the invention assembled in a representative decoy configuration.

FIG. 2 is an elevational view of a silhouette supported by the modular units and providing a second dimension to the decoy of the present invention.

DETAILED DESCRIPTION

Referring now to FIG. 1, shown therein is a plan view of a representative decoy of the present invention. The decoy shown in FIG. 1 is one which simulates the shape of an F-16 aircraft, although it is understood that the novel modular decoy of the present invention may be configured to any desirable shape, and, therefore the invention herein shall not be limited to the specific representative example presented. The decoy 10 comprises a plurality of appropriately shaped modules in the form of table units 11a-k which when assembled in an abutting relationship, as shown in the plan view of FIG. 1, simulates the outline of the vehicle. Each table unit 11 may comprise a top of plywood or the like on a frame constructed of lumber or the like and comprising a pair of lateral pieces 12 and two or more cross pieces 13, as represented by dotted lines in unit 11c. As shown more clearly in the side elevational view of FIG. 2, the supporting frame may further include a plurality of supporting legs 14 at the corners of each unit 11, and a plurality of struts 15 to support the plywood tops. Each unit 11a-k is supported above ground level by legs 14 in order to provide that the entire surface area defined by all modules 11a-k, when assembled together by bolts or the like, both simulates the outline of the decoy vehicle, and casts an appropriate shadow 16 (shown by broken outline in FIG. 1) by reason of the elevation (e.g., 4 to 5 feet) of the unit 11 top surfaces. The shadow cast as a result of the height of the units 11 is a key element in providing a high degree of fidelity for the decoy 10 of the present invention.

As shown in FIG. 2, the decoy of the present invention will preferably include a vertically disposed element 17 of plywood or the like and defining a silhouette in the desired shape of the simulated vehicle in furtherance of the deception created by decoy 10. A shadow cast by element 17 will accurately simulate the shadows cast by a genuine vehicle (e.g., F-16 as represented in the drawings) in furtherance of the deception against air surveillance. The silhouette provided by element 17 may additionally provide a deception as observed at a distance near ground level.

In order to support element 17 in the vertical as shown in FIG. 2, slots 18 defined by pairs of boards 19 or the like may be provided on the upper surfaces of selected units 11. Representative slots 18 are shown in units 11d and 11e of FIG. 1. For convenience of storage and assembly or disassembly, vertical element 17 may comprise a plurality of vertical sections 17a-f (shown by dotted lines) which when assembled define the shape of element 17. Support for these elements may then be provided by including supporting board 19 pairs on all units supporting a vertical element (e.g., 11a,b,c,d,e,f,g).

It is noteworthy that all described elements of decoy 10 may be configured to be collapsible for compact storage, and, further, that exposed surfaces (e.g., surfaces 11 and element 17) may be painted as appropriate for realistic simulation of the decoyed vehicle. Further, each of the plurality of modules 11 may be sized and configured such that a plurality of vehicles may be simulated by suitable arrangement and assembly of the modular units. Any of a plurality of inexpensive decoys may therefore be assembled from a single set of modular units 11.

The present invention, a hereinabove described, therefore provides a novel decoy providing unique dual profile of a vehicle for the purpose of deception against enemy surveillance and attack. It is understood that certain modifications to the invention as described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

We claim:

1. A decoy for providing the deceptive appearance of a genuine object comprising:
 (a) a first plurality of modular table units, each of predetermind size and shape, and assembled in a predetermined abutting relationship to define a substantially flat surface having the peripheral shape and size approximating a full size plan view of said object;
 (b) each of said table units comprising a frame defining a portion of said flat surface, and a plurality of legs independently supporting said frame in a spaced relationship to a surface supporting said table units, whereby the surfaces of all said table units are supported at the same level and a shadow of said plan view of said object is defined on said supporting surface;
 (c) at least one of said table units having a surface thereon including means defining a slot; and
 (d) a substantially flat, vertical element supported on said modular units in said slot, said vertical element defining a substantially full size silhouette of a side elevational view of said object.

2. The decoy as recited in claim 1 wherein said vertical element comprises a second plurality of sections each of predetermined size and shape assembled in abutting relationship in the slot to define said full size silhouette.

* * * * *